(12) United States Patent
De Siqueira (10) Patent No.: US 12,358,272 B2
(45) Date of Patent: *Jul. 15, 2025

(54) ZONED ELASTIC FILM AND LAMINATES COMPRISING THE SAME

(71) Applicant: Kimberly-Clark Worldwide, Inc., Neenah, WI (US)

(72) Inventor: Jose Augusto Vidal De Siqueira, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 483 days.

This patent is subject to a terminal disclaimer.

(21) Appl. No.: 17/631,587

(22) PCT Filed: Jul. 31, 2019

(86) PCT No.: PCT/US2019/044459
§ 371 (c)(1),
(2) Date: Jan. 31, 2022

(87) PCT Pub. No.: WO2021/021184
PCT Pub. Date: Feb. 4, 2021

(65) Prior Publication Data
US 2022/0332105 A1 Oct. 20, 2022

(51) Int. Cl.
*B32B 37/15* (2006.01)
*B32B 5/02* (2006.01)
(Continued)

(52) U.S. Cl.
CPC .......... *B32B 37/153* (2013.01); *B32B 5/022* (2013.01); *B32B 7/027* (2019.01); *B32B 7/05* (2019.01);
(Continued)

(58) Field of Classification Search
CPC ....... B32B 37/153; B32B 5/022; B32B 7/027; B32B 7/05; B32B 27/08; B32B 27/12;
(Continued)

(56) References Cited

U.S. PATENT DOCUMENTS

| | | |
|---|---|---|
| 6,245,401 B1 | 6/2001 | Ying et al. |
| 6,833,179 B2 | 12/2004 | May et al. |

(Continued)

FOREIGN PATENT DOCUMENTS

| | | |
|---|---|---|
| CN | 104175676 A | 12/2014 |
| EP | 0748197 B1 | 7/1999 |

(Continued)

OTHER PUBLICATIONS

Enping Yuyuan Nonwoven Co.Ltd, Global Companies, https://www.companiess.com/enping_yuyuan_nonwoven_co_ltd_info909175.html.

*Primary Examiner* — Elizabeth M Imani
(74) *Attorney, Agent, or Firm* — KIMBERLY-CLARK WORLDWIDE, INC.

(57) ABSTRACT

The present invention provides for an elastic film comprising a machine direction (MD) and a cross-machine direction (CD) wherein a first MD orientated zone comprises a first polymer composition which comprises of a first melt strength and a first width dimension. The film also comprises a second MD orientated zone disposed immediately adjacent to the first MD orientated zone in the CD and comprises a second polymer composition which comprises of a second melt strength with a second width dimension. The first polymer composition and first melt strength are different in comparison with the second polymer composition and second melt strength.

15 Claims, 5 Drawing Sheets

(51) Int. Cl.
*B32B 7/027* (2019.01)
*B32B 7/05* (2019.01)
*B32B 27/08* (2006.01)
*B32B 27/12* (2006.01)
*B32B 27/32* (2006.01)

(52) U.S. Cl.
CPC .............. *B32B 27/08* (2013.01); *B32B 27/12* (2013.01); *B32B 27/32* (2013.01); *B32B 2250/02* (2013.01); *B32B 2250/04* (2013.01); *B32B 2250/242* (2013.01); *B32B 2250/40* (2013.01); *B32B 2305/20* (2013.01); *B32B 2307/732* (2013.01); *B32B 2323/00* (2013.01)

(58) Field of Classification Search
CPC . B32B 27/32; B32B 2250/02; B32B 2250/04; B32B 2250/242; B32B 2250/40; B32B 2305/20; B32B 2307/732; B32B 2323/00; B32B 27/20; B32B 2262/0253; B32B 2264/102; B32B 2264/104; B32B 2307/51; B32B 2307/514; B32B 27/327; B32B 2264/108; B29C 48/022; B29C 48/49; B29C 55/06; B29C 48/19
See application file for complete search history.

(56) References Cited

U.S. PATENT DOCUMENTS

| | | | |
|---|---|---|---|
| 8,907,156 | B2 | 12/2014 | Roe et al. |
| 9,168,186 | B2 | 10/2015 | Armstrong-Ostle et al. |
| 9,233,500 | B2 | 1/2016 | Gorman et al. |
| 2002/0193032 | A1 | 12/2002 | Newkirk et al. |
| 2010/0297387 | A1 | 11/2010 | Rasmussen |
| 2012/0003432 | A1 | 1/2012 | O'Donnell et al. |
| 2012/0172826 | A1* | 7/2012 | Ng .................... B32B 5/022 428/156 |
| 2014/0093703 | A1* | 4/2014 | Hanschen ........... B32B 25/10 428/221 |
| 2016/0067116 | A1 | 3/2016 | Beckman et al. |
| 2017/0022339 | A1 | 1/2017 | Hanschen et al. |
| 2017/0253012 | A1* | 9/2017 | Chang ................. B29C 48/21 |
| 2017/0312147 | A1 | 11/2017 | Bianchi et al. |
| 2018/0042785 | A1 | 2/2018 | Dalal et al. |

FOREIGN PATENT DOCUMENTS

| | | |
|---|---|---|
| EP | 1022125 A1 | 7/2000 |
| WO | 2017201402 A1 | 11/2017 |

* cited by examiner

ZONED ELASTIC FILM AND LAMINATES COMPRISING THE SAME

BACKGROUND OF THE DISCLOSURE

Coextrusion of two or more polymer compositions with different physical properties may enable forming composite sheet or film products that have components defined by distinct layers or zones corresponding to each material extruded. Depending on how the polymer compositions are extruded, each material may be laminated one on top of another across the film and/or be disposed across the film side-by-side to one another.

Conventional laminate materials are designed to have substantially homogeneous tension across the width of the material. These materials are often composed of either a continuous meltblown elastic web or a series of identical continuous elastomer filaments bonded with a meltblown elastic web. One process for producing a continuous filament stretch-bonded laminate is described in U.S. Pat. No. 5,385,775, issued to Wright, the disclosure of which is incorporated by reference. Additionally, reinforcing filaments have been produced independently of the elastic spinning process to implement bands having greater tension. However, this procedure is expensive and results in an uncomfortable material.

Further, when conventional elastic laminate materials are wound onto rolls, the finished roll has varying diameters across the width of the roll resulting from varying tension and/or stretch across the width of the material. These varying diameters cause unwinding difficulties in the converting process due to the tendency of the material to steer across guide rolls and to not lay flat on the cutting rolls. Therefore, there exists a need for improving the coextrusion process of polymer compositions.

SUMMARY OF THE DISCLOSURE

There is a need to improve performance and appearance of an elastic film at a lower cost. The current disclosure addresses this need by applying a first and second polymer composition in a zoned fashion across the width of the elastic film. When the inventive elastic film is laminated to a nonwoven material, the zoned deposition of the first and second polymer compositions may provide for differing degrees of bonding with the nonwoven. Accordingly, in certain embodiments the present invention provides a laminate comprising a polymer film comprising first zone consisting of a first polymer composition and a second zone consisting of a second polymer composition wherein the first polymer composition is not bonded to the nonwoven material and the second polymer composition is bonded to the nonwoven material.

In another embodiment, the present invention is directed to an elastic film having a width dimension, a length dimension, a surface area, a machine direction (MD) and a cross-machine direction (CD). The elastic film comprises a first MD orientated zone having a first width dimension, comprising a first polymer composition having a first melt strength. The elastic film also comprises a second MD orientated zone having a second width dimension, the second MD orientated zone disposed immediately adjacent to the first MD orientated zone in the CD and comprising a second polymer composition having a second melt strength. Additionally, the first polymer composition and first melt strength are different from the second polymer composition and second melt strength. Furthermore, in certain instances, the first and second melt strengths may determine the width of the first and second MD orientated zones of the elastic film after exiting a die lip.

In a further embodiment, the present invention is directed to a laminate comprising elastic film and a nonwoven material having a machine direction (MD) and cross-machine direction (CD). The elastic film comprises a first MD orientated zone having a first width dimension and comprising a first polymer composition having a first melt strength. The elastic film also comprises a second MD orientated zone having a second width disposed immediately adjacent to the first MD orientated zone in the CD and comprising a second polymer composition having a second melt strength. Preferably the first and second melt strengths are different and result in the first and second MD orientated zones having different widths after exiting a die lip and before the nonwoven web material contacts the elastic film to form the nonwoven composite.

In an additional embodiment, the present invention is directed to a method of manufacturing an elastic film comprising the steps of providing a coextruder body having a first and second inlet and first and second flow passageways having a first and second width dimensions supplying a first polymer composition having a first melt strength to the first inlet, supplying a second polymer composition having a second melt strength to the second inlet. The method also comprises flowing the first and second polymer compositions through first and second flow passageways. The first and second polymer compositions pass through the flow passageways and converge to form a continuous edge laminated film.

DEFINITIONS

When introducing elements of the present disclosure or the preferred embodiment(s) thereof, the articles "a", "an", and "the" are intended to mean that there are one or more of the elements.

The terms "comprising", "including" and "having" are intended to be inclusive and mean that there may be additional elements other than the listed elements.

The term "polymer" generally includes but is not limited to, homopolymers, copolymers, including block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries. For some embodiments, the term "copolymer" as used herein may mean a composition that includes more than one polymer and/or other additives that may not be polymeric but are included with a polymeric material to improve properties of the composition.

The term "machine direction" or "MD" refers to length of the film in the direction in which the film is produced. The term "cross machine direction" or "CD" refers to the width of film, i.e., a longest dimension of the film in a direction generally perpendicular to the MD. For example, a first polymer composition may be maintained in a first portion of the width of the film and a second polymer composition may be maintained distinct from the first portion in a second portion of the width of the film.

The term "elastic" means a material that is generally capable of recovering its shape after deformation when the deforming force is removed. Specifically, as used herein, elastic is meant to be that property of any material which upon application of a biasing force, permits that material to be stretchable to a stretched biased length which is at least about 50 percent greater than its relaxed unbiased length, and that will cause the material to recover at least 40 percent of its elongation upon release of the stretching elongating force. A hypothetical example which would satisfy this definition of an elastic material would be a one (1) inch sample of a material which is elongatable to at least 1.50 inches and which, upon being elongated to 1.50 inches and released, will recover to a length of not more than 1.30 inches. Many elastic materials may be stretched by much more than 50 percent of their relaxed length, and many of these will recover to substantially their original relaxed length upon release of the stretching, elongating force. This latter class of materials is generally beneficial for purposes of the present invention.

The term "zone" or "zoned" refers to an area or region set off as distinct from surrounding or adjoining parts as a result of the composition and width dimension of the given area or region. Generally, the polymer composition of a zone is substantially uniform through the machine direction (MD) dimension of the zone.

The term "melt strength" refers to resistance of the polymer melt to stretching. The melt strength of a material is related to the molecular chain entanglements of a polymer composition and its resistance to untangling under strain and is specifically defined as the maximum tension that may be applied to a melt without breaking. Melt strength is further described in the test method section below.

The term "melt flow index" (MFI) is a measure of the ease of flow of the melt of a polymer composition. MFI is measured according to ISO 1133-1 and is described in the test method section below. MFI has units of g/10 minutes and is the measurement of the mass of a polymer, in grams, flowing in ten minutes through a capillary of a specific diameter and length by a pressure applied via prescribed alternative gravimetric weights for alternative prescribed temperatures.

The term "coextruder body" for illustrative purposes herein includes an extruder(s), spin pump, feedblock and a film die.

The term "converged output" refers to where a polymer composition(s) exit(s) at a die lip.

The term "caliper" is the distance between two opposite sides of a final film or laminated film product. Caliper of the final film or laminated film product is measured by SEM as described in the test method section below.

The term "nonwoven" generally refers to a fibrous web having a structure of individual fibers or filaments which are interlaid, but not in an identifiable manner as in a knitted fabric. The terms "fiber" and "filament" are used herein interchangeably. Nonwoven webs may be formed from many processes such as, for example, meltblowing processes, spunbonding processes, air laying processes, and bonded carded web processes. Nonwoven webs also include films that have been cut into narrow strips, perforated or otherwise treated to allow air to pass through.

The term "spunbonded fibers" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al. Spunbond fibers are quenched and generally not tacky on the surface when they enter the draw unit, or when they are deposited onto a collecting surface. Spunbond fibers are generally continuous and may have average diameters larger than 7 microns, often between about 10 and 40 microns.

The term "meltblown fibers" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than 10 microns in diameter, and are generally self bonding when deposited onto a collecting surface. Meltblown fibers used in the invention are preferably substantially continuous.

DETAILED DESCRIPTION

Figure 1:
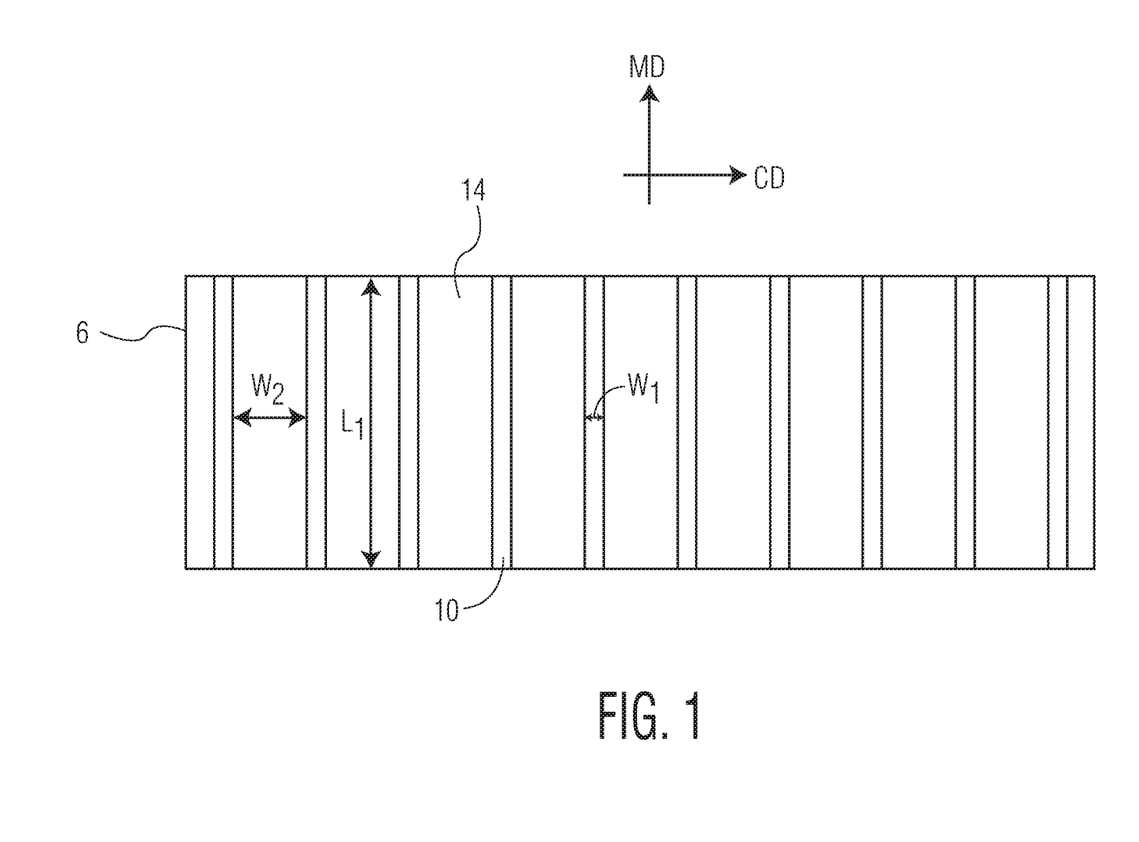
FIG. 1 is a schematic view of an elastic film including two different MD orientated zones, a width dimension, a length dimension, a machine direction (MD) and a cross-machine direction (CD).

As shown in FIG. 1, the elastic film material 6 has a machine direction (MD) and a cross-machine direction (CD). The elastic film material 6 includes a first MD orientated zone 10 having a first width dimension, W1, and a second MD orientated zone 14 having a second width dimension, W2. The elastic film material 6 also has a length L1 dimension. As shown in FIG. 1, the L1 dimension is measured from top to bottom of the elastic film 6 in the machine direction.

The widths, W1 and W2, of the first and second MD orientated zones 10, 14 are determined by the melt strength of the polymer compositions used to form the respective first and second MD orientated zones 10, 14. In other words, the melt strength of each polymer composition controls the width, W1 and W2, of each of the first and second MD orientated zones 10, 14 of the elastic film.

Melt strength of a first and second polymer composition of an elastic film material 6 generally refers to the melt tension of the material measured as described in the test methods section below. Generally, the first and second polymer compositions have different melt strengths. For example, the melt strength of the first polymer composition may be greater than the melt strength of the second polymer composition. For example, first polymer composition may have a first melt strength equal to or greater than 20 cN at 210° C. and the second polymer composition may have a second melt strength less than 20 cN at 210° C. For example, the first polymer composition may have a melt strength from 20 to about 30 cN at 210° C., such as from about 22 to about 25 cN at 210° C. The second polymer composition may have a melt strength from 10 to about 19 cN at 210° C., such as from about 12 to about 17 cN at 210° C.

In FIG. 1, W1 is narrower in width compared to W2. While in the embodiment illustrated in FIG. 1, W1 is less than W2, the invention is not so limited. In other instances, the width, W1, of the first orientated zone 10 may be wider than the width, W2, of the second orientated zone 14. Regardless of whether W1 is greater than W2, or W2 is greater than W1, it is generally preferred that the width, W1 and W2, of the first and second MD orientated zones 10, 14 is different on account of the polymer compositions forming the respective zones having different melt strengths. In certain instances, the width of the first MD orientated zones is about 5 to 10 times greater than the width of the second MD orientated zone, preferably about 6 to 8 times greater than the width of the second MD orientated zone and most preferably about 7 times greater than the width of the second MD orientated zone.

Additionally, as the width of either the first or second MD orientated zones increase or decrease the surface area, each corresponding zone will increase or decrease proportionally. Thus, in other embodiments the surface area of the of the first and second MD orientated zones 10, 14 may differ. For example, the surface area of first MD orientated zone 10 may be less than the second MD orientated zone 14. In other embodiments the surface area of the first MD orientated zone may be about 5 to 10 times greater than the width of the second MD orientated zone, preferably the surface area of the first MD orientated zone may be about 6 to 8 times greater than the width of the second MD orientated zone and most preferably the surface area of the first MD orientated zone may be 7 times greater than the width of the second MD orientated zone.

In other embodiments the caliper, C1, C2, of the first and second MD orientated zones 10, 14 may differ due to the melt strengths of the respective polymer compositions. In general, the polymer composition that has the higher melt strength will have the greater caliper. Accordingly, in one embodiment, the first MD orientated zone 10 may be formed form a polymer composition having a greater melt strength compared to the polymer composition forming the second MD orientated zone 14 causing the first MD orientated zone 10 to have a greater caliper, C1, than the second MD orientated zone 14. The caliper, C1, for the first MD orientated zone 10 may be from about 110 um to about 180 um, 125 um to 170 um, 127 um to 150 um, 130 um to about 140 um. The caliper, C2, of the second MD orientated zone 14 may be from about 10 um to about 35 um, 15 um to about 25 um, 18 um to about 20 um.

Accordingly, the first MD orientated zone has a caliper that is at least about 3 times greater than the caliper of the second MD orientated zone. More preferably, the first MD orientated zone may have a caliper that is about 5, 7, 10, or 12 times greater than the second MD orientated zone.

Both MD orientated zones 10, 14 extend generally continuously in the MD and are spaced apart, and adjacent to one another, in the CD. Preferably, the first MD orientated zone 10 and second MD orientated zone 14 are made from different polymers or polymer blends, (i.e., have different compositions). The polymer compositions for the first 10 and second 14 orientated zones may be selected from a propylene-based copolymer composition. The propylene-based copolymer composition may consist of ethylene-propylene (EP) random copolymers, ethylene-propylene-butylene (EPB) random terpolymers, heterophasic random copolymers, butylene polymers, metallocene polypropylenes, propylene-based elastomers or combinations thereof.

Any of a variety of propylene-based copolymer compositions may generally be employed.

Particularly suitable propylene-based copolymer compositions are available commercially from ExxonMobil Chemical Co. (Houston, TX) under the tradename VISTAMAXX™. For example, in one embodiment, the first polymer composition may comprise VISTAMAXX 6102™ (6102) and the second polymer composition may comprise VISTAMAXX 6202™.

Particularly useful styrene-diene block copolymers include those commercially available from Kraton Polymers LLC (Houston, TX) under the trade name KRATON™. Suitable KRATON™ polymers include for example styrene-diene block copolymers, such as styrene-butadiene, styrene-isoprene, styrene-butadiene-styrene, and styrene-isoprene-styrene. Other useful KRATON™ polymers include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. Particularly suitable Kraton™ block copolymers include those sold under the brand names G 1652, G 1657, G 1730, MD6673, and MD6973.

In still other embodiments, the first and second zones may comprise styrene-ethylene-propylene-styrene (S-EP-S) copolymers include the S-EP-S elastomeric copolymers available from Kuraray Company, Ltd. (Okayama, Japan) under the trade name SEPTON™. Still other suitable copolymers include styrene and butadiene, S-B-S or S-I-S copolymers elastomeric copolymers available from Dexco Polymers, LP of Houston, TX under the trade designation VECTOR™. Also suitable are polymer compositions composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly(ethylene-propylene)-styrene-poly(ethylene-propylene) ("S-EP-S-EP") block copolymer.

In an additional preferred embodiment, polyurethane elastomeric materials such as, for example, those available under the trademark ESTANE from Noveon, polyamide elastomeric materials such as, for example, those available under the trademark PEBAX (polyether amide) from Atofina Chemicals Inc., of Philadelphia, Pa., and polyester elastomeric materials such as, for example, those available under the trade designation HYTREL from E.I. DuPont De Nemours and Company may be employed.

In one particular embodiment, a polyethylene is employed that is a copolymer of ethylene or propylene and an a-olefin, such as a $C_3$-$C_{20}$ a-olefin or $C_3$-$C_{12}$ a-olefin. Suitable a-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired a-olefin comonomers are 1-butene, 1-hexene and 1-octene. INFUSE™ 9108 and 9508 by Dow Chemical of Midland, MI is a general-purpose plastic elastomer olefin block copolymer that may be employed herein as well.

In a further embodiment, particularly suitable polymer elastomers such as EXACT™ from ExxonMobil Chemical Company of Houston, TX may be used herein. Other suitable polyethylene elastomers are available under the designation ENGAGE™ and AFFINITY™ from Dow Chemical Company of Midland, MI Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes; FINA™ (e.g., 8573) from Atofina Chemicals of Feluy, Belgium; TAFMER™ available from Mitsui Petrochemical Industries; and VERSIFY™ available from Dow Chemical Co. of Midland, MI Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Figure 2:
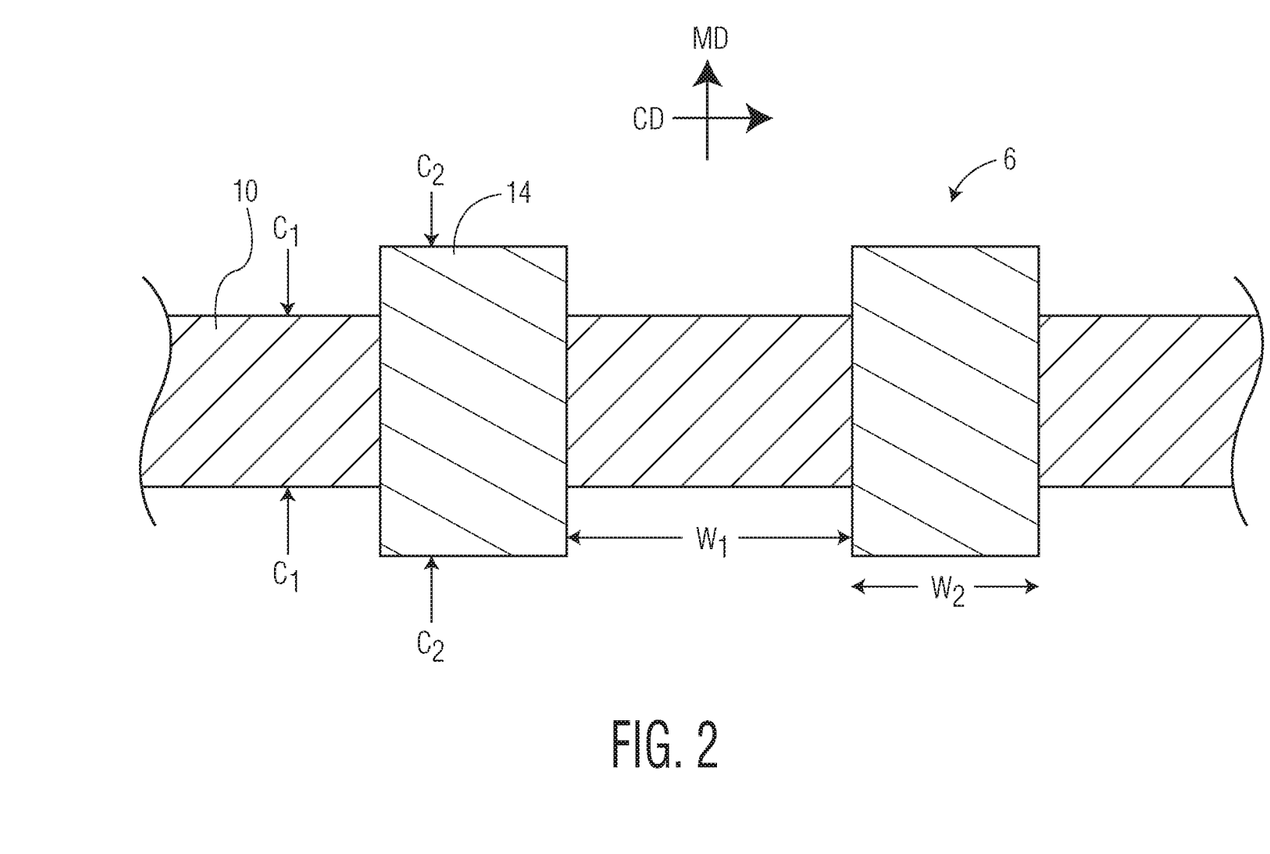
FIG. 2 illustrates a cross-section view of an elastic film wherein two different zones are shown in a MD and CD.

FIG. 2 illustrates a cross-section of an elastic film. The elastic film material 6 includes a first MD orientated zone 10 and a second MD orientated zone 14. First MD orientated zone 10 and second orientated zone 14 are made from different polymers or polymer blends, (i.e., have different compositions).

In certain embodiments, the zoned elastic film may be laminated to a non-elastic material such as spunbond to form a laminated composite. In certain instances when the zoned elastic film is laminated to non-elastic material, particularly a fibrous non-elastic material, the film may become impregnated with fibers decreasing the elastic properties of the film.

Lamination may be achieved by layering the zoned film between two facing layers, with spunbond fibers, meltblown fibers, staple fibers, or combinations thereof, and passing the three (3) layers through a bonding nip to form the laminate. As bonding occurs between facing and film during lamination, the facing will bond to the material with the greater MFI. More specifically, for ease of understanding the two zones in relation to each other, the first MD orientated zone will have the polymer composition with the lower MFI in comparison with the polymer composition of the second MD orientated zone. Additionally, the polymer composition with more elasticity such as the polymer composition used in the first MD orientated zone will not bond to the elastic film.

Moreover, the polymer composition with more elastic properties will not be impregnated with filaments from the laminate and will be able to maintain its elastic properties at the elastic zone. The bonding will be more predominant with the use of the greater MFI polymer composition which is found on the second MD orientated zoned film area. The result is a free flowing first MD orientated zone that is not impregnated with facing filament.

Figure 3:
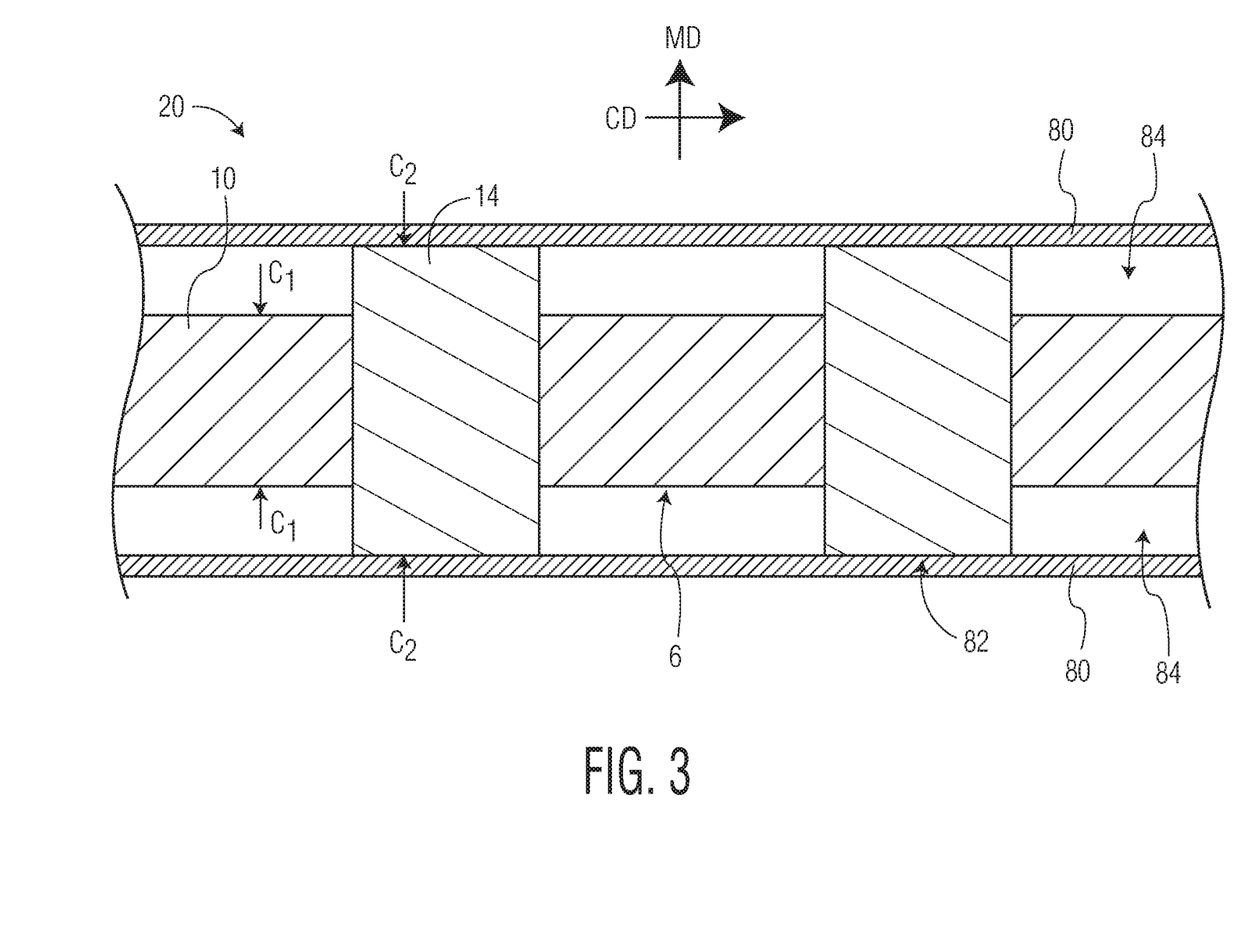
FIG. 3 illustrates a cross-section view of a nonwoven composite wherein an elastic laminated film is bonded to a nonwoven web material.

FIG. 3 illustrates a cross-section of an elastic film laminate 20. The elastic film material 6 is sandwiched between two nonwoven web layers 80. In FIG. 3, the elastic film laminate 20 comprises an elastic film material 6 having a plurality of first MD orientated zones 10 and second MD orientated zones 14. The first and second MD orientated zones may be arranged next to each other and substantially uniformly spaced. The first MD orientated zone 10 may be narrower, to or wider than the second MD orientated zone 14. The nonwoven web layers 80 may comprise of spunbond fibers, meltblown fibers, staple fibers, or a combination thereof.

In one embodiment, the nonwoven web layers 80 may be a spunbonded web, meltblown web or bonded carded web or a combination thereof. The nonwoven web layers refer to a structure of individual fibers or threads which are interlaid but not in an identifiable pattern as in a woven fabric. Spunbond material or spunbonded web as used herein refers to small diameter fibers which are formed by extruding molten thermoplastic material as filaments from a plurality of fine, usually circular capillaries of a spinneret with the diameter of the extruded filaments then being rapidly reduced. Spunbond fibers are generally continuous. If the nonwoven web layers 80 are each a web of meltblown fibers, each of the nonwoven web layers 80 may include meltblown microfibers. The nonwoven web layers 80 may be made of fiber forming polymers such as, for example, polyolefins. Exemplary polyolefins include one or more of polypropylene, polyethylene, ethylene copolymers, propylene copolymers, and butene copolymers.

For one embodiment, one or both of the nonwoven web layers 80 may include a multilayer material having, for example, at least one layer of spunbonded web joined to at least one layer of meltblown web, bonded carded web or other suitable material. A single layer of material such as, for example, a spunbonded web having a basis weight of from about 0.2 to about 10 ounces of material per square yard (osy) or a meltblown web having a basis weight of from about 0.2 to about 8 osy, may form each of the nonwoven web layers 80. In some embodiments, a composite material made of a mixture of two or more different fibers or a mixture of fibers and particulates may form each of the nonwoven web layers 80. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel), occurs prior to collection of the meltblown fibers upon a collecting device to form a coherent web of randomly dispersed meltblown fibers and other materials.

When the nonwoven web layers 80 are each a nonwoven web of fibers, the fibers may be joined by interfiber bonding to form a coherent web structure. Entanglement between individual meltblown fibers may produce this interfiber bonding. While fiber entangling is inherent in the meltblown process, the entangling may further be generated or increased by processes such as, for example, hydraulic entangling or needle punching. For some embodiments, a bonding agent may increase the desired bonding.

Additionally, FIG. 3 depicts a preferred bonded area 82 between the second MD orientated zone 14 and the nonwoven web layers 80 and a nonbonded area 84 between the first MD orientated zone 10 and the nonwoven web layers 80. In other instances, the preferred bonded area 82 may be between the first MD orientated zone and the nonwoven web layers 80 and the nonbonded area 84 may be between the second MD orientated zone and the nonwoven web layers 80.

In a preferred embodiment, the melt flow index (MFI) of each polymer composition determines whether the nonwoven web layers 80 are bonded or nonbonded to the zoned areas 10, 14. More specifically, the polymer composition in the zoned area with the lower MFI will bond to the nonwoven web layers 80 and the polymer composition with the higher MFI will not bond to the nonwoven web layers 80.

In an additional embodiment, melt strength of a first and second polymer composition of an elastic film laminate 20 is indicated by melt tension. In certain embodiments the first polymer composition may have a first melt strength equal to or greater than 20 cN at 210° C. and the second polymer composition may have a second melt strength less than 20 cN at 210° C. For example, the first polymer composition may have a melt strength from 20 to about 30 cN at 210° C., such as from about 22 to about 25 cN at 210° C. The second polymer composition may have a melt strength from 10 to about 19 cN at 210° C., such as from about 12 to about 17 cN at 210° C.

In a further preferred embodiment in view of FIG. 3, the width of either the first or second MD orientated zones increase or decrease the surface area proportionally. Thus, in other embodiments the surface area of the first and second MD orientated zones 10, 14 may differ. For example, the surface area of the first MD orientated zone 10 may be less than the second MD orientated zone 14. In other embodiments the surface area of the first MD orientated zone may be about 5 to 10 times greater than the width of the second MD orientated zone, preferably the surface area of the first MD orientated zone may be about 6 to 8 times greater than the width of the second MD orientated zone and most preferably the surface area of the first MD orientated zone may be 7 times greater than the width of the second MD orientated zone.

Figure 4:
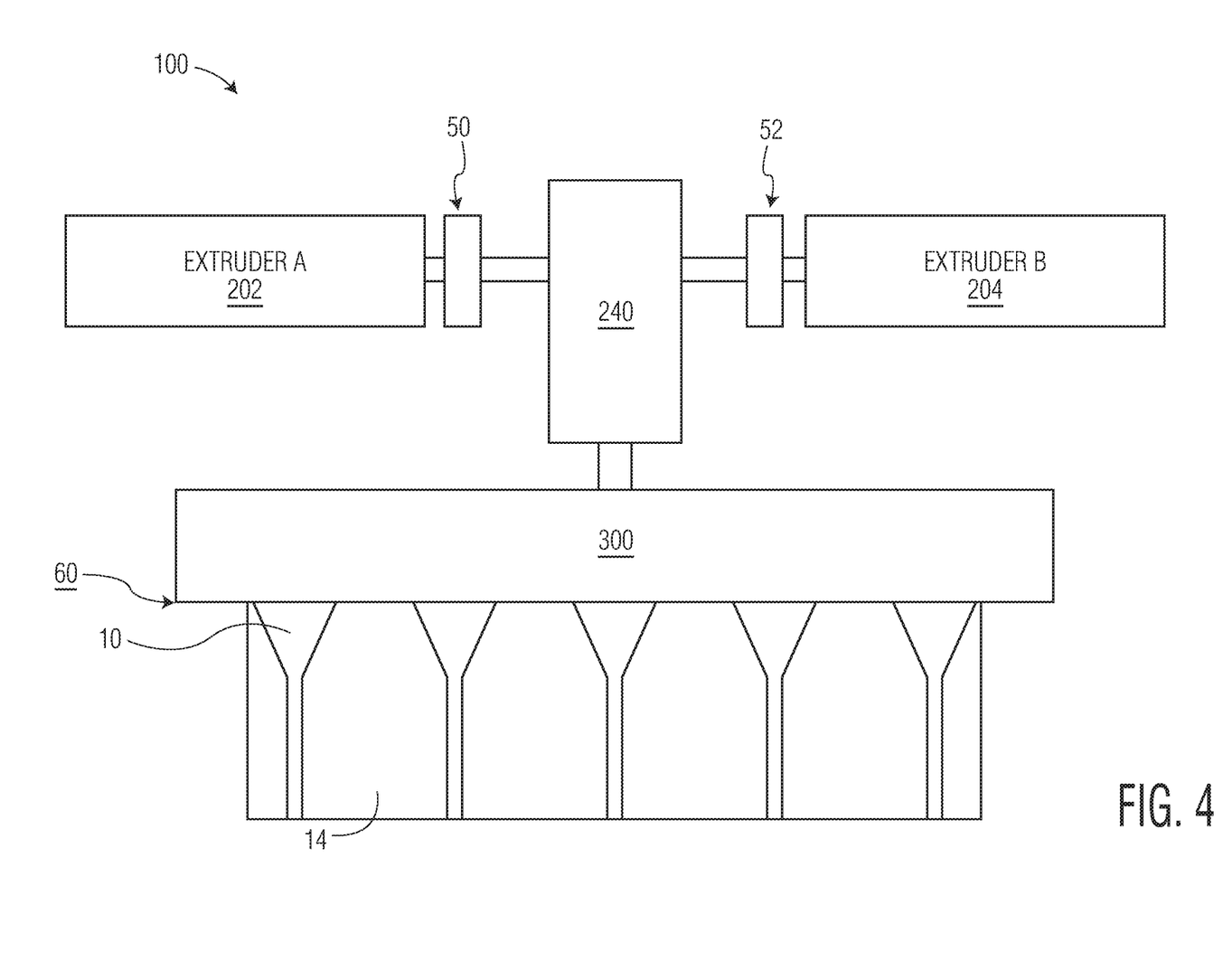
FIG. 4 illustrates a system for coextruding polymer compositions by using a spin pump to control the amount of polymer composition coming out of each extrude whereby a narrowing of a first MD orientated zone on an elastic film is created, according to one embodiment.

FIG. 4 illustrates coextrusion of two polymer compositions, 202, 204 wherein the polymer compositions have disparate melt strengths (MS). In certain instances the polymer compositions 202, 204 are processed at similar temperatures during the coextrusion process, but the dimensions of the extrusion die may be varied so as to provide a zoned film having zones of different width dimensions. For example, the die width (W, having units of centimeter), which generally corresponds to the CD dimension of the film, may be varied such that a first polymer composition has an extruded width that is different than the extruded width of the second polymer composition. Particularly in preferred embodiments, the polymers have disparate MS's, but similar densities, and are extruded at two different widths to provide a film having differing width dimensions along its CD.

The system 100 may include two different polymer compositions extruded side-by-side such that lamination occurs along an edge seam bisecting a thickness of the film and extending in a machine direction (MD). In some embodiments, multiple edge laminations between polymers may form CD zones that provide multiple stripes of the polymers across the film at any interval in the CD. The edge lamination may occur within a central region of the film and not necessarily at or toward CD sides of the film.

More specifically, FIG. 4 shows a system 100 for coextruding different polymer compositions into an edge laminated film, according to one embodiment. The system 100 includes an extruder A and extruder B wherein extruder A is supplied with a first polymer composition 202 and extruder B is supplied with a second polymer composition 204.

Once the first polymer composition 202 and second polymer composition 204 are supplied into the appropriate extruder each polymer composition feeds into a feedblock 240, wherein each polymer composition flows into the feedblock 240 on separate channels until the polymer compositions 202, 204 are mated together onto a zoned elastic film inside the film die 300. More specifically, once the polymer compositions are in the feedblock 240, the first polymer composition rotates 90 degrees one way and the second polymer composition rotates 90 degrees in the opposite direction. A spin pump 50 from each extruder A and extruder B controls the amount of polymer composition flow that enters the feedblock 240. If the spin pump 50 speed is increased, the amount of polymer composition that is found in the final film or laminate will increase.

Each polymer composition 202, 204 passes through the feedblock 240 into a film die 300. The polymer compositions 202, 204 pass into separate channels through an insert in the film die 300. One channel directs one of the polymer compositions to the front of the film die 300, and the other channel directs the other polymer composition to the back of the film die 300. Thereafter, both polymer compositions meet each other near the die lip 60 and exit the film die 300 at separate zones 10, 14 bonded side by side to one another. More specifically, in a preferred embodiment, once the polymer compositions 202, 204 exit the film die 300 through a die lip 60 to produce a first and second MD orientated zoned film 10, 14 or a first and second MD orientated zoned laminated film, the width of the polymer composition in the first MD orientated zone 10 narrows, as shown in FIG. 4.

While in the feedblock 240 and film die 300, the polymer composition with a higher melt strength will retract and the polymer composition with low melt strength will expand. Immediately after the polymer compositions exit the film die 300, the polymer compositions have the same width on the elastic film. However, as the polymer compositions exit the die lip 60 but before the polymer compositions contact a chill roll to cool down and gain final elastic film form, the melt strength of each polymer composition controls the width of the first and second orientated zoned areas 10, 14 on the elastic film.

Additionally, the spin pump 50 controls the amount of polymer composition that goes into a feedblock 240. After leaving the feedblock 240, the polymer composition moves into a film die 300 and exits through a die lip 60. As the polymer composition exits the die lip, prior to cooling, the melt strength from each polymer composition forms the zoned areas on the elastic film wherein the width of the polymer composition with the higher MS narrows.

Overall, it is important to note that the polymer composition with the quicker flow rate through the feedblock 240 and the film die 300 has a lower molecular weight and therefore a lower melt strength compared with the other polymer composition. In other words, the polymer composition that has a higher flow rate has a higher molecular weight therefore a higher melt strength compared to the other polymer composition. Moreover, there is a correlation between melt flow index and melt strength. When comparing two or more polymer compositions, the polymer composition with the highest melt flow index has the lowest melt strength and visa versa.

Further, in view of the final film or laminated film prepared through the extruders, multiple zones of the first and second polymer compositions may be used to provide alternating regions having different functionality. For example, multiple zones of elastic polymer regions across films in some embodiments enable CD zones at the polymer composition regions favorable to bonding with non-elastomeric material and that do not create inefficiency caused by bonding to the more expensive elastic polymer that may thereby be rendered inelastic.

Figure 5:
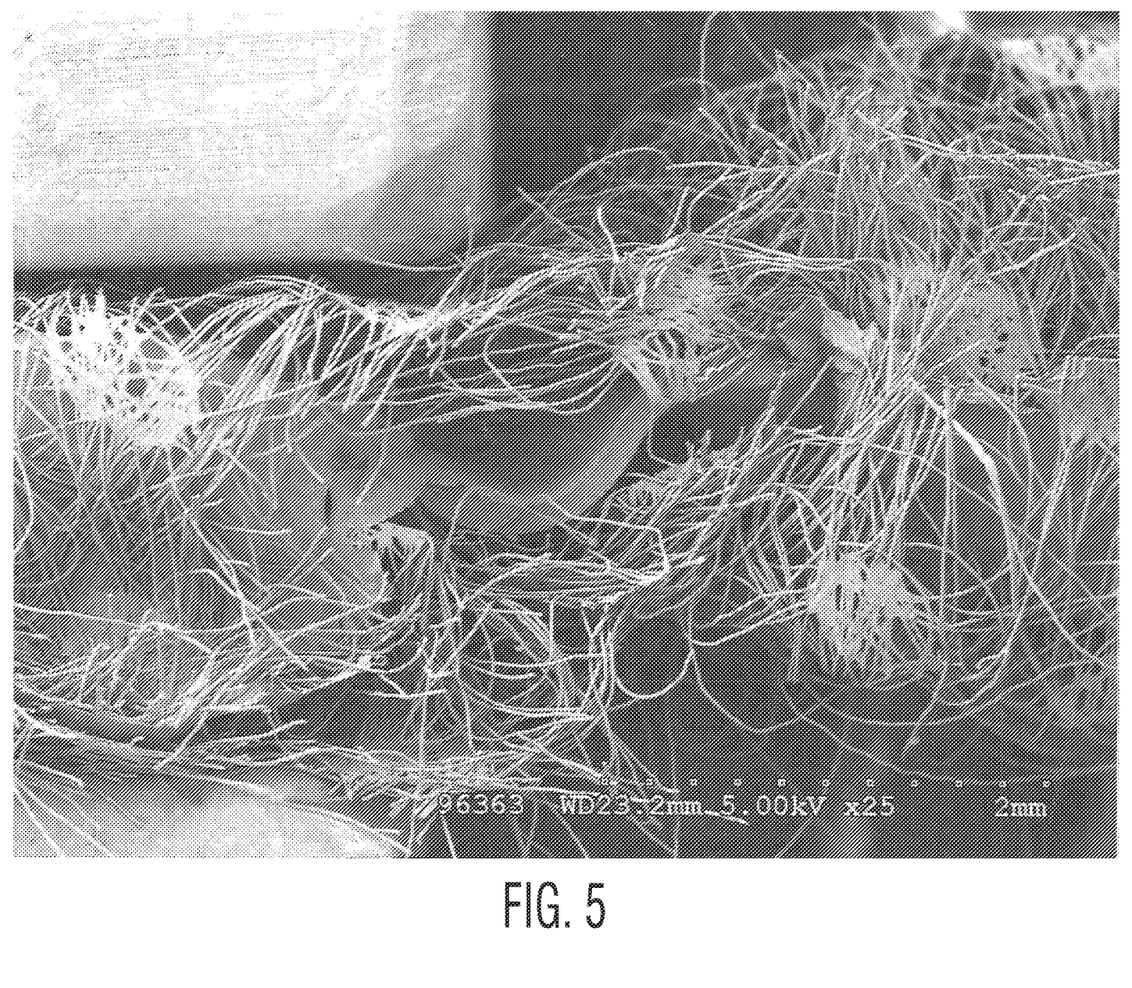
FIG. 5 is a SEM photo of a first MD orientated nonbonded zone and a second MD orientated bonded zone.

FIG. 5 presents a SEM photo depicting a laminated elastic film where filaments are both attached and not attached to an elastic film. FIG. 5 also shows the correlation between the polymer composition and caliper in the zoned areas. The filaments are attached to the polymer composition at the zoned area where the caliper of the elastic film is thinner. Specifically, the first MD orientated zoned polymer composition, Vistamaxx 6102™ (6102), is attached to the caliper area on the elastic film where the filaments are not attached to the elastic film. Vistamaxx 6202™ (6202) is attached to the caliper area on the elastic film where the filaments are attached to the elastic film.

After the laminated film was produced through the coextruder body, caliper measurements for each zone may be measured using SEM. In view of FIG. 5, the first MD orientated zone 10 had a greater caliper than the second MD orientated zone 14. The caliper for the first MD orientated zone 10 may be from about 110 um to about 180 um, 125 um to 170 um, 127 um to 150 um, 130 um to about 140 um. The caliper of the second MD orientated zone 14 may be from about 10 um to about 35 um, 15 um to about 25 um, 18 um to about 20 um. In general, as the caliper of either the first or second MD orientated zones increase or decrease the surface area of the composite sheet or film of each corresponding zone will increase or decrease proportionally.

TEST METHODS

Melt Strength

Melt strength of a film or material is indicated by melt tension. Melt tension is determined with a Gottfert Rheotens melt tension apparatus from Gottfert Inc. by measuring the tension of a strand of molten polymer material according to the manufacture's instructions. The polymer to be examined is extruded at an extrusion rate of 0.13 cc/sec. at an apparent shear rate of approximately 15 reciprocal seconds and temperature from 210° C. through a capillary 20 mm long and 2 mm in diameter; the strand is then subjected to stretching using a drawing system with a constant acceleration rate based on the particular material. The tension has units of centimeter Newtons (cent-Newtons, cN). The higher the melt tension means the greater the melt strength values which, in turn, are indicative of a particular material's strain hardening ability.

Melt Flow Index

ISO standard 1133-1 test method cover the determination of the rate of extrusion of molten polymer resins using an extrusion plastometer. Generally; after a specified preheating time, resin is extruded through a die with a specified length and orifice diameter under prescribed conditions of temperature; load, and piston position in a coextruder. For simplicity, test method ISO standard 131-1 is only described specifically herein since it is the method used in the disclosure.

ISO standard 1133-1: procedure for measurement of the melt flow rate (MFI). The procedure for determining MFI is as follows:
1. A small amount of the polymer sample (around 4 to 5 grams) is taken in a specially designed MFI apparatus. A die with an opening of typically around 2 mm diameter is inserted into the apparatus.
2. The material is packed properly inside the barrel to avoid formation of air pockets.
3. A piston is introduced which acts as the medium that causes extrusion of the molten polymer.
4. The sample is preheated for a specified amount of time: 5 min at 190° C. for a polyethylene and 6 min at 230° C. for a polypropylene.
5. After the preheating a specified weight is introduced onto the piston. Examples of standard weights are 2.16 kg, 5 kg, etc.
6. The weight exerts a force on the molten polymer and it immediately starts flowing through the die.
7. A sample of the melt is taken after the desired period of time and is weighed accurately.
8. MFI is expressed in grams of polymer per 10 minutes of duration of the test.

SEM

SEM images where obtained using a JOEL, 6360LV Scanning Electron Microscope (SEM). The SEM forms images with electrons instead of light. Thus, SEM forms high magnification photographs of 25×t magnification with excellent depth of field. An EDS detector on the SEM allows identification of the elements present to reach sizes smaller than one micrometer (40 micro-inches) in size. Cross sectional measurements may also be made with this SEM. The results are in the form of black and white images.

Caliper

ISO 534: method used for measuring the thickness of a single or multiple sheets of film or laminate as a single sheet thickness. ISO 534 is used in combination with the SEM disclosed above to obtain caliper.

EXAMPLE

An elastic film according to the present invention was prepared using a coextrusion apparatus substantially as illustrated in FIG. 4. A formulation of 98% VISTAMAXX 6102™ (6102) with 2% red pigment was introduced as a first polymer composition into a coextruder and 100% VISTAMAXX 6202™ (6202) was introduced into the coextruder as a second polymer composition. Melt Flow Index (MFI) for 6102 was 1.4 g/10 min. and for 6202 it was 9.1 g/10 min. MFI was determined according to the ISO standard 1133-1 test method described above. Melt strength for 6102 was 22 cN at 210° C. and the melt strength for 6202 was 15 cN at 210° C.

The first polymer composition was introduced into an extruder at 210° C. while the second polymer composition entered an extruder at 210° C. The coextruder temperature was also at 210° C. The final temperature of both the first and second polymer compositions on the elastic film when exiting the die body are the same. This is due to heat transfer as both first and second polymer compositions flow through channels inside the feedblock and film die.

Furthermore, in view of using 6101 and 6202 propylene-based copolymer compositions, the elastic film width of the 6202 zone was seven times greater than the width of the 6102 zone. The caliper for the first MD orientated zone was measured at about 135 um and the caliper of the second MD orientated zone was measured at about 19 um.

EMBODIMENTS

First Embodiment: In a first embodiment the invention provides an elastic film having a width dimension, a length dimension, a surface area, a machine direction (MD) and a cross-machine direction (CD), the film comprising a first MD orientated zone, a first width dimension, a first polymer composition having a first melt strength; and a second MD orientated zone, a second width dimension disposed immediately adjacent to the first MD orientated zone in the CD and comprising a second polymer composition that has a second melt strength. The first polymer composition and first melt strength are different in comparison with the second polymer composition and second melt strength.

The elastic film according to preceding embodiment, wherein the first melt strength is higher than the second melt strength.

The elastic film according to anyone of the preceding embodiments, wherein the first melt strength is lower than the second melt strength.

The elastic film according to the preceding embodiment, wherein the first and second melt strengths are measured by melt tension.

The elastic film according to the preceding embodiment, wherein the first melt strength is equal to or greater than 20 cN at 210° C. and the second melt strength is less than 20 cN at 210° C.

The elastic film according to anyone of anyone of the preceding embodiments, wherein the first width dimension is narrower than the second width dimension.

The elastic film according to anyone of anyone of the preceding embodiments, wherein the first MD orientated zone has a caliper that is greater than the caliper of the second MD orientated zone.

The elastic film according to anyone of anyone of the preceding embodiments, wherein the first MD orientated zone has a caliper that is at about 7 times thicker than the caliper of the second MD orientated zone.

The elastic film according to anyone of anyone of the preceding embodiments, wherein the first MD orientated zone comprises caliper from about 130 to about 140 μm and the second MD orientated zone comprises caliper from about 18 to about 20 μm.

The elastic film according to anyone of the preceding embodiments, wherein the surface areas of the first MD orientated zone and the second MD orientated zone are different.

The elastic film according to anyone of the preceding embodiments, wherein the first and the second polymer compositions are a propylene-based copolymer selected from the group consisting of ethylene-propylene (EP) random copolymers, ethylene-propylene-butylene (EPB) random terpolymers, heterophasic random copolymers, butylene polymers, metallocene polypropylenes, propylene-based elastomers or combinations thereof.

The elastic film according to anyone of the preceding embodiments, further comprising a filler selected from the group consisting of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives.

Second Embodiment: In a second embodiment the invention provides for a nonwoven composite which comprises an elastic film having a machine direction (MD) and cross-machine direction (CD), a first MD orientated zone comprising a first polymer composition having a first melt strength. The nonwoven composite also comprises a second MD orientated zone disposed immediately adjacent to the first MD orientated zone in the CD. The nonwoven also comprises a first and second polymer composition and a first and second melt strength wherein both the polymer compositions and melt strengths are different. The nonwoven composite also comprises a nonwoven web material that contains fibers.

The nonwoven composite of anyone of the preceding embodiment, wherein the first melt strength is higher than the second melt strength.

The nonwoven composite of anyone of the preceding embodiments, wherein the first melt strength is lower than the second melt strength.

The nonwoven composite according to the preceding embodiments, wherein the first and second melt strengths are measured by melt tension.

The nonwoven composite according to the preceding embodiments, wherein the first melt strength is equal to or greater than 20 cN at 210° C. and the second melt strength is less than 20 cN at 210° C.

The nonwoven composite of anyone of the preceding embodiments, wherein the first width dimension is narrower than the second width dimension.

The nonwoven composite of anyone of the preceding embodiments, wherein the first MD orientated zone has a caliper that is greater than the caliper of the second MD orientated zone.

The nonwoven composite of anyone of the preceding embodiments, wherein the first MD orientated zone has a caliper of about 7 times thicker than that of the second MD orientated zone.

The nonwoven composite of anyone of the preceding embodiments, wherein the first MD orientated zone has caliper from about 130 to about 140 μm and the second MD orientated zone has caliper from about 18 to about 20 μm.

The nonwoven composite of anyone of the preceding embodiments, wherein the nonwoven web material comprises spunbond fibers, meltblown fibers, staple fibers, or combinations thereof.

The nonwoven composite of anyone of the preceding embodiments, wherein the elastic film is positioned between the nonwoven web material and an additional nonwoven web material.

The nonwoven composite of anyone of the preceding embodiments, wherein the film and the nonwoven web are disposed in facing arrangement with one another and the film and the nonwoven web are selectively bonded to one another substantially along the first MD orientated zone.

Third Embodiment: In a third embodiment the invention provides for a method of coextruding copolymer compositions into an elastic film. The method comprises supplying a first polymer having a first Melt Strength (MS) to a first inlet of a coextruder body. The method also comprises supplying a second polymer having a second MS to a second inlet of the coextruder body. The method further comprises flowing the first polymer composition through a first zoned area and flowing the second polymer composition through a second zoned area, wherein both compositions pass through the body to a converged output. The first flow zoned area has a first width dimension and the second zoned area has a second width dimension. The method also comprises outputting the converged output to form the edge laminated film continuous across a full width of the film wherein at the converged output of the first and second zoned areas the first and second MS's determine the width of the first and second MD orientated zones on the elastic film.

The method according to the preceding embodiment, wherein the first and second polymer composition and corresponding melt strengths determine the width of the first and second MD orientated zones on the elastic film after exiting a die lip.

The method of anyone of the preceding embodiment, wherein the first melt strength is higher than the second melt strength.

The method of anyone of the preceding embodiments, wherein the first melt strength is lower than the second melt strength.

The method according to the preceding embodiments, wherein the first and second melt strengths are measured by melt tension.

The method according to the preceding embodiment, wherein the first melt strength is equal to or greater than 20 cN at 210° C. and the second melt strength is less than 20 cN at 210° C.

The method of anyone of the preceding embodiments, wherein the first width dimension is narrower than the second width dimension.

The method of anyone of the preceding embodiments, wherein the first MD orientated zone has a caliper of about 7 times thicker than that of the second MD orientated zone.

The method of anyone of the preceding embodiments, wherein the first MD orientated zone has caliper from about 130 to about 140 μm and the second MD orientated zone has caliper from about 18 to about 20 μm.

The method of anyone of the preceding embodiments, wherein the first and the second polymers are a propylene-based copolymer comprising ethylene-propylene (EP) random copolymers, ethylene-propylene-butylene (EPB) random terpolymers, heterophasic random copolymers, butylene polymers, metallocene polypropylenes, propylene-based elastomers or combinations thereof.

What is claimed is:

1. An elastic film having a width dimension, a length dimension, a surface area, a machine direction (MD) and a cross-machine direction (CD), the film comprising:
   a. a first MD orientated zone comprising a first width dimension, a first polymer composition having a first melt strength; and
   b. a second MD orientated zone having a second width dimension disposed immediately adjacent to the first MD orientated zone in the CD and comprising a second polymer composition having a second melt strength;
   wherein the first polymer composition and first melt strength are different from the second polymer composition and second melt strength; and
   c. wherein the first polymer composition has a first melt flow index and the second polymer composition has a second melt flow index higher than the first melt flow index to cause the first polymer composition in the first MD orientated zone to bond to a nonwoven web material and the second polymer composition in the second MD orientated zone to not bond to the nonwoven web material.

2. The elastic film according to claim 1, wherein one of the first melt strength and second melt strength is equal to or greater than 20 cN at 210° C. and the other of the first melt strength and the second melt strength is less than 20 cN at 210° C.

3. The elastic film according to claim 1, wherein the first width dimension is narrower than the second width dimension.

4. The elastic film of claim 1, wherein the first MD orientated zone has a caliper that is greater than the caliper of the second MD orientated zone.

5. The elastic film of claim 1, wherein the first MD orientated zone has a caliper that is about 7 times thicker than the caliper of the second MD orientated zone.

6. The elastic film of claim 1, wherein the first MD orientated zone comprises caliper from about 130 to about 140 μm and the second MD orientated zone comprises caliper from about 18 to about 20 μm.

7. The elastic film of claim 1, wherein the surface areas of the first MD orientated zone and the second MD orientated zone are different.

8. The elastic film of claim 1, wherein the first and the second polymer compositions are a propylene-based copolymer selected from the group consisting of ethylene-propylene (EP) random copolymers, ethylene-propylene-butylene (EPB) random terpolymers, heterophasic random copolymers, butylene polymers, metallocene polypropylenes, propylene-based elastomers or combinations thereof.

9. The elastic film of claim 1, further comprising a filler selected from the group consisting of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives.

10. A nonwoven composite comprising an elastic film having a machine direction (MD) and cross-machine direction (CD), a first MD orientated zone comprising a first polymer composition having a first melt strength; and a second MD orientated zone disposed immediately adjacent to the first MD orientated zone in the CD and comprising a second polymer composition and a second melt strength; wherein the widths of the first and second polymer compositions and the first and second melt strengths are different; a nonwoven web material that contains fibers, wherein the first polymer composition in the first MD orientated zone is bonded to the nonwoven web material and the second polymer composition in the second MD orientated zone is not bonded to the nonwoven web material based on the first polymer composition having a first melt flow index and the second polymer composition having a second melt flow index higher than the first melt flow index.

11. The nonwoven composite of claim 10, wherein one of the first melt strength and second melt strength is equal to or greater than 20 cN at 210° C. and the other of the first melt strength and the second melt strength is less than 20 cN at 210° C.

12. The nonwoven composite of claim 10, wherein the first width dimension is narrower than the second width dimension.

13. The nonwoven composite of claim 10, wherein the nonwoven web material comprises spunbond fibers, meltblown fibers, staple fibers, or combinations thereof.

14. The nonwoven composite of claim 10, wherein the elastic film is positioned between the nonwoven web material and an additional nonwoven web material.

15. The nonwoven composite of claim 10, wherein the film and the nonwoven web are disposed in facing arrangement with one another and the film and the nonwoven web are selectively bonded to one another substantially along the first MD orientated zone.

* * * * *